United States Patent
Chang et al.

(10) Patent No.: US 9,016,939 B2
(45) Date of Patent: Apr. 28, 2015

(54) THERMAL SENSOR WITH SECOND-ORDER TEMPERATURE CURVATURE CORRECTION

(71) Applicants: Ching-Ho Chang, Hsinchu (TW); Jui-Cheng Huang, Hsinchu (TW); Yung-Chow Peng, Hsinchu (TW)

(72) Inventors: Ching-Ho Chang, Hsinchu (TW); Jui-Cheng Huang, Hsinchu (TW); Yung-Chow Peng, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 205 days.

(21) Appl. No.: 13/632,498

(22) Filed: Oct. 1, 2012

(65) Prior Publication Data

US 2014/0092939 A1    Apr. 3, 2014

(51) Int. Cl.
  *G01K 7/00* (2006.01)
  *G01K 7/01* (2006.01)

(52) U.S. Cl.
  CPC .......................... *G01K 7/01* (2013.01)

(58) Field of Classification Search
  USPC ................... 374/170, 178, 166, 110; 327/512
  See application file for complete search history.

(56) References Cited

U.S. PATENT DOCUMENTS

| | | | |
|---|---|---|---|
| 6,008,685 A * | 12/1999 | Kunst | 327/512 |
| 7,010,440 B1 * | 3/2006 | Lillis et al. | 702/65 |
| 2004/0108866 A1 * | 6/2004 | Burns et al. | 324/763 |
| 2014/0140364 A1 * | 5/2014 | Charles et al. | 374/1 |

OTHER PUBLICATIONS

Michiel A. P. Pertijs; A CMOS Smart Temperature Sensor with a 3 Inaccuracy of +0.1C from −55C to 125C; IEEE Journal of Solid-State Circuits, vol. 40, No. 12, Dec. 2005, p. 2805-2815.
Michiel A. P. Pertijs; A CMOS Smart Temperature Sensor with a 3 Inaccuracy of +0.1C from −50C to 120C; IEEE Journal of Solid-State Circuits, vol. 40, No. 2, Feb. 2, 2005, p. 454-461.

* cited by examiner

*Primary Examiner* — Mirellys Jagan
(74) *Attorney, Agent, or Firm* — Eschweiler & Associates, LLC

(57) ABSTRACT

Some embodiments of the present disclosure relate to a stacked integrated chip structure having a thermal sensor that detects a temperature of one or a plurality of integrated chips. In some embodiments, the stacked integrated chip structure has a main integrated chip and a secondary integrated chip located on an interposer wafer. The main integrated chip has a reference voltage source that generates a bias current. The secondary integrated chip has a second thermal diode that receives the bias current and based thereupon generates a second thermal sensed voltage and a second reference voltage that is proportional to a temperature of the secondary integrated chip. A digital thermal sensor within the main integrated chip determines a temperature of the secondary integrated chip based upon as comparison of the second thermal sensed voltage and the reference voltage.

20 Claims, 6 Drawing Sheets

US 9,016,939 B2

THERMAL SENSOR WITH SECOND-ORDER TEMPERATURE CURVATURE CORRECTION

BACKGROUND

Integrated chips generate thermal energy during operation due to power being dissipated as heat by the resistance of on-chip components. As the size of integrated chip components shrinks, the amount of heat generated by integrated chip has increased. For example, in modern integrated chips, the large number of transistors, high circuit density, small cross section of interconnect wires, and high frequency of operation contribute to an increase in heat generated by an integrated chip.

In modern integrated chips, a temperature of an integrated chip has become a concern, as the temperature of an integrated chip can effect the operation of an integrated chip and in some cases even damage on chip components. Therefore, in many modern integrated chips, which have a large number of transistors and a high frequency of operation, the temperature of an integrated chip is monitored to ensure that the chip does not overheat.

DETAILED DESCRIPTION

Figure 1A:
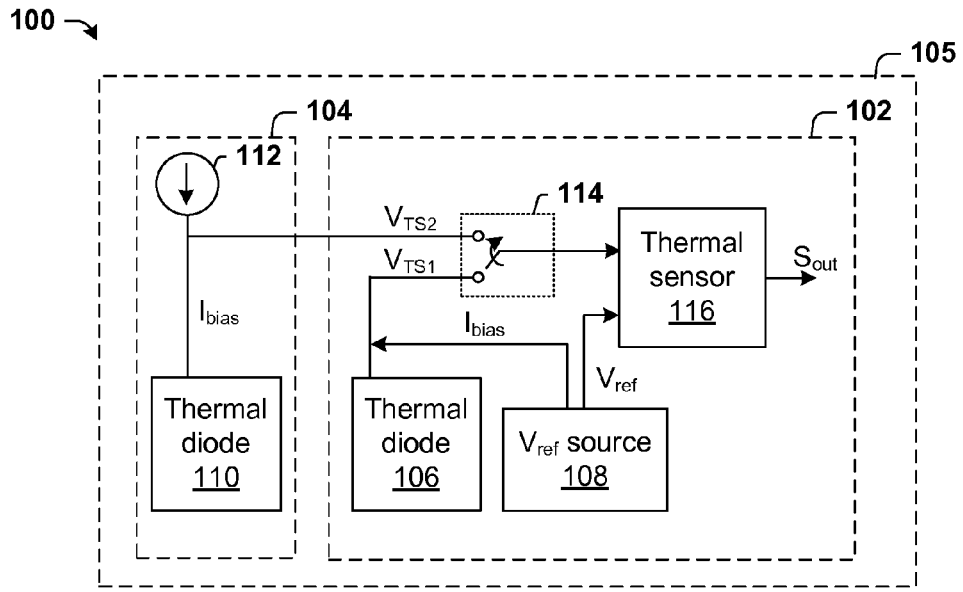
FIG. 1A illustrates a block diagram of a stacked integrated chip having a conventional thermal sensor configured to determine the temperature of a plurality of integrated chips located on an interposer wafer.

One or more implementations of the present disclosure will now be described with reference to the attached drawings, wherein like reference numerals are used to refer to like elements throughout. The drawings are not necessarily drawn to scale.

FIG. 1A illustrates a block diagram of a conventional stacked integrated chip structure 100 having plurality of integrated chips 102, 104 formed by different processes and located on an interposer substrate 105. A main integrated chip 102 has a thermal sensor 116. The thermal sensor 116 is configured to receive a reference voltage $V_{ref}$ from the first integrated chip and a first thermal sensed voltage $V_{TS1}$ from a first thermal diode 106 within the main integrated chip 102 or a second thermal sensed voltage $V_{TS2}$ from a second thermal diode 110 within a secondary integrated chip 104. Based upon the received voltages, the thermal sensor 116 is configured to generate an output signal $S_{out}$ according to the transfer function:

$$\text{Transfer\_fucntion} = \frac{V_{TSx}(T)}{V_{BG}(T)} = \frac{V_{TSx}(T)}{V_{TS1}(T) + \Delta V_{TS}(T) \cdot \text{Gain}}$$

Such a transfer function allows for the thermal sensor 116 to accurately measure temperatures of the main integrated chip 102. However, since the secondary integrated chip 104 is formed using a different process (with different tolerances) than the main integrated chip 102, the transfer function results in errors in the temperature of the secondary integrated chip 104.

Figure 1B:
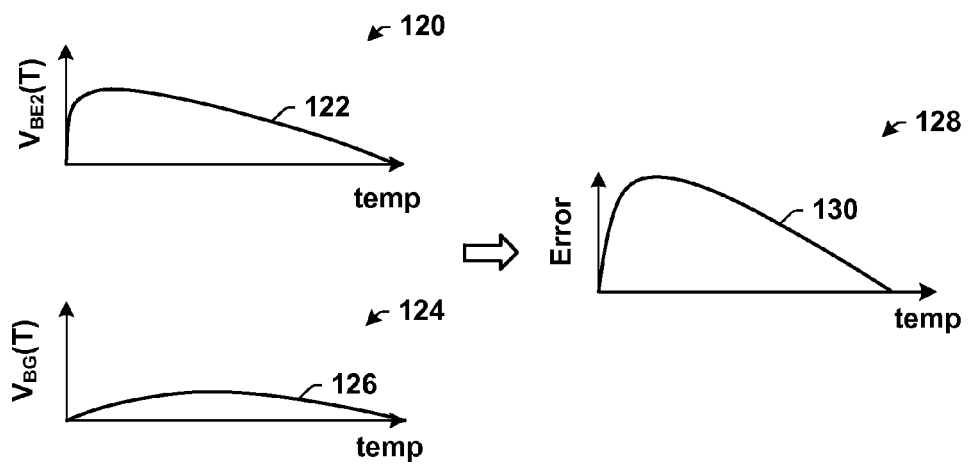
FIG. 1B shows graphs of signals received by the conventional digital thermal sensor and an output signal generated based upon the received signals.

For example, FIG. 1B shows graphs of signals received by thermal sensor 116 and an output signal $S_{out}$ generated based upon the received signals for a secondary integrated chip temperature measurement. As shown in graphs 120 and 124, the second thermal sensed voltage 122 and reference voltage 126 have different curvatures. The different curvatures are a result of the reference voltage 126 being generated by an integrated chip formed by a different process than that of the secondary integrated chip 104, which generated the second thermal sensed voltage. As shown in graph 128, the different curvatures increase an error 130 of the thermal sensor 116.

Accordingly, the present disclosure relates to a stacked integrated chip structure comprising a thermal sensor configured to accurately detect a temperature of a plurality of integrated chips located on an interposer substrate. In some embodiments, the stacked integrated chip structure comprises a main integrated chip and a secondary integrated chip located on an interposer wafer. The main integrated chip comprises a reference voltage source configured to generate a first reference voltage and a bias current. The secondary integrated chip has a second thermal diode configured to receive the bias current and based thereupon to generate a second reference voltage and a second thermal sensed voltage that is proportional to a temperature of the secondary integrated chip. A thermal sensor comprised within the main integrated chip is configured to determine a temperature of the secondary integrated chip based upon as comparison of the second thermal sensed voltage and the second reference voltage.

Figure 2:
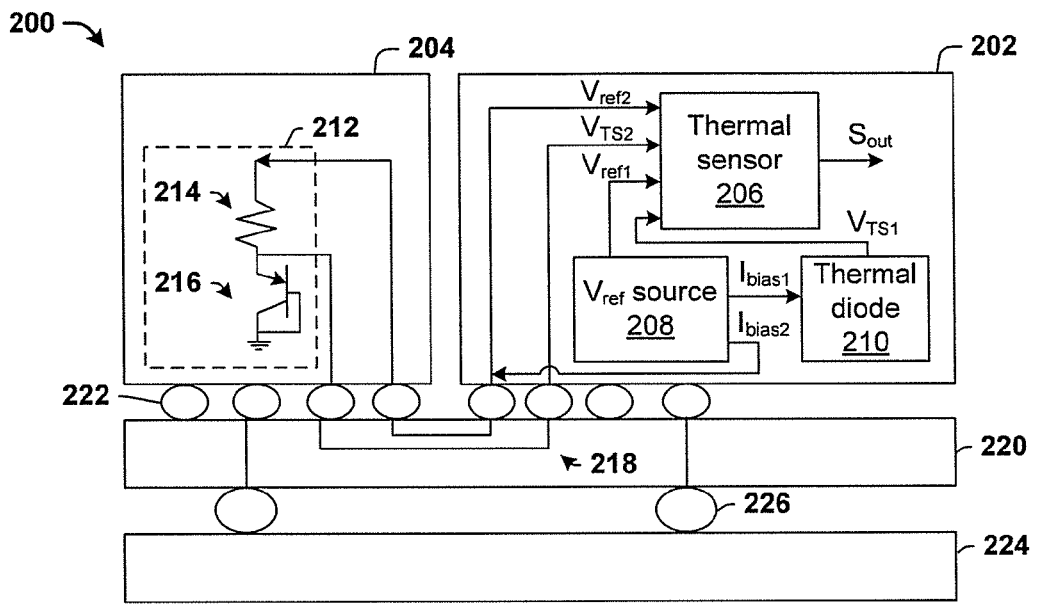
FIG. 2 illustrates a block diagram of some embodiments of a stacked integrated chip structure comprising a disclosed thermal sensor configured to account for temperature errors resulting from processing variations.

FIG. 2 illustrates a block diagram of some embodiments of a stacked integrated chip structure 200 comprising a disclosed thermal sensor configured to account for temperature errors resulting from processing variations between integrated chips located on an interposer substrate 220. Although the figures provided herein illustrate the disclosed thermal sensor in regards to a stacked structure comprising a 2.5D integrated chip, the disclosed thermal sensor is not limited to such structure but rather may also be implemented in stacked integrated chip structures comprising a 3D integrated chip, for example.

The stacked integrated chip structure 200 comprises a main integrated chip 202 and a secondary integrated chip 204 located on an interposer substrate 220. In some embodiments, the main integrated chip 202 is formed by a first integrated chip fabrication process and the secondary integrated chip 204 is formed by a second integrated chip fabrication process. For example, the main integrated chip 202 may be formed by a 45 nm process having a first set of tolerances and processing variations, while the secondary integrated chip 204 is formed by a 28 nm process having a second set of tolerances and processing variations smaller than that of the 45 nm process. In other embodiments, the main integrated chip 202 and the secondary integrated chip 204 can be formed by a same integrated chip fabrication process (e.g., a 45 nm process).

The main integrated chip 202 and the secondary integrated chip 204 are electrically connected to interconnects 218 within the interposer substrate 220 by way of a plurality of micro-bumps 222. In some embodiments, the interconnects 218 comprise copper or aluminum metallization layers configured to communicate electric signals between the main integrated chip 202 and the secondary integrated chip 204. In various embodiments, the interposer substrate 220 may comprise a glass wafer or a silicon wafer. In some embodiments, the interposer substrate 220 may be further connected to a package substrate 224 by way of one or more solder bumps 226.

The main integrated chip 202 comprises a reference voltage source 208 and a first thermal diode 210. The reference voltage source 208 is configured to generate a first reference voltage $V_{ref1}$ that is substantially temperature independent. The reference voltage source 208 is further configured to generate a bias current $I_{bias}$ that is temperature dependent (e.g., that is proportional to the absolute temperature ($I_{PTAT}$) for a reference voltage source 208 comprising a bandgap reference circuit). The first thermal diode 210 is configured to receive the bias current $I_{bias}$, and to generate a first thermal sensed voltage $V_{TS1}$ with a temperature dependency based upon the bias current $I_{bias}$. The secondary integrated chip 204 comprises a second thermal diode 212 configured to receive the bias current $I_{bias}$. Based upon the received bias current $I_{bias}$, the second thermal diode 212 is configured to generate a second thermal sensed voltage $V_{TS2}$ with a temperature dependence and a second reference voltage $V_{ref2}$ based upon the bias current $I_{bias}$.

In some embodiments, the second thermal diode 212 comprises a resistor 214 connected in series with a diode connected PNP transistor device 216. The resistor 214 has a first terminal connected to the reference voltage source 208 by way of a interconnect 218 (e.g., a metal interconnect) within the interposer substrate 220 and a second terminal. The diode connected PNP transistor device 216 has a first terminal connected to the second terminal of the resistor 214 and a second terminal connected to ground. The second thermal diode 212 is configured to output a second thermal sensed voltage $V_{TS2}$ comprising a base-emitter voltage of the diode connected PNP transistor device 216 at the second terminal of the resistor 214. The second thermal diode 212 is further configured to output a second reference voltage $V_{ref2}$ that is equal to a value of the voltage at the first terminal of the resistor 214.

The main integrated chip 202 further comprises thermal sensor 206. The thermal sensor 206 is configured to receive a temperature dependent thermal sensed voltage $V_{TS}$ and a temperature independent reference voltage $V_{ref}$, and to generate a digital output signal $S_{out}$ based upon a comparison of the thermal sensed voltage $V_{TS}$ and the reference voltage $V_{ref}$. The digital output signal $S_{out}$ corresponds to a temperature of the integrated chip from which the thermal sensed voltage $V_{TS}$ is received.

For example, during a first mode of operation, in which the thermal sensor 206 is operated to detect a temperature of the main integrated chip 202, the bias current $I_{bias}$ is provided to the first thermal diode 210. Upon receiving the bias current $I_{bias}$, the first thermal diode 210 is configured to generate a first thermal sensed voltage $V_{TS1}$ proportional to a temperature of the main integrated chip 202. The first thermal sensed voltage $V_{TS1}$ is provided to the thermal sensor 206. Upon receiving the first reference voltage $V_{ref1}$ and the first thermal sensed voltage $V_{TS1}$, the thermal sensor 206 operates to compare the first thermal sensed voltage $V_{TS1}$ and the first reference voltage $V_{ref1}$ and to generate an output signal $S_{out1}$ that is proportional to the temperature of the main integrated chip 202 based upon the comparison.

During a second mode of operation, in which the thermal sensor 206 is operated to detect a temperature of the secondary integrated chip 204, the bias current $I_{bias}$ is provided to the second thermal diode 212. Upon receiving the bias current 6 as, the second thermal diode 212 is configured to generate a second thermal sensed voltage $V_{TS2}$ proportional to a temperature of the secondary integrated chip 204 and a second reference voltage $V_{ref2}$ having a substantially temperature independent value. The second thermal sensed voltage $V_{TS2}$ and the second reference voltage $V_{ref2}$ are provided by way of the one or more interconnects 218 to the thermal sensor 206. Upon receiving the second reference voltage $V_{ref2}$ and the second thermal sensed voltage $V_{TS2}$, the thermal sensor 206 operates to compare the second thermal sensed voltage $V_{TS2}$ and the second reference voltage $V_{ref2}$ and to generate an output signal $S_{out1}$ that is proportional to the temperature of the secondary integrated chip 204 based upon the comparison.

Figure 3:
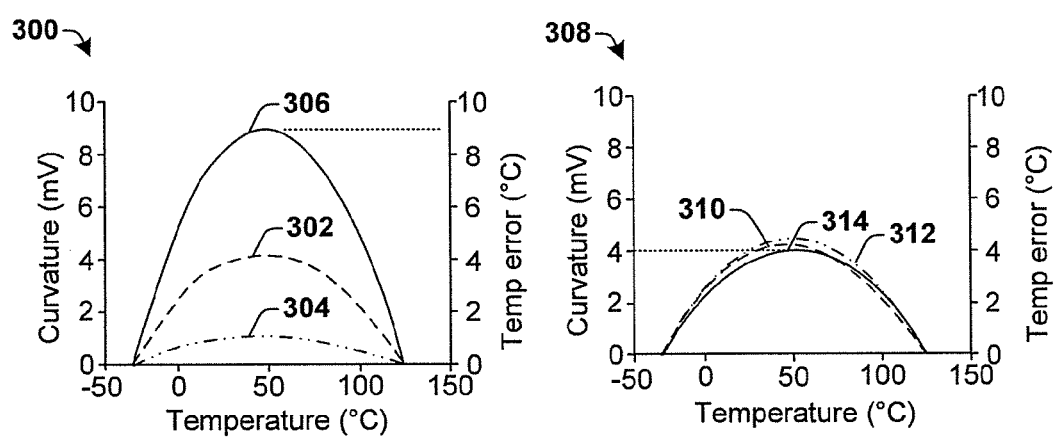
FIG. 3 illustrates graphs showing simulation results of a conventional thermal sensor and the disclosed thermal sensor.

Therefore, stacked integrated chip structure 200 is configured to detect a temperature of multiple integrated chips by using a thermal sensor 206 configured to receive thermal sensed voltages and reference voltages received from the multiple integrated chips FIG. 3 illustrates graphs 300, 308 showing simulation results of a conventional thermal sensor (graph 300) and the disclosed thermal sensor (graph 308). The graphs 300, 308 illustrate how the disclosed thermal sensor reduces temperature errors. The simulation was run for a main integrated chip having a thermal sensor formed with processing variations corresponding to a 28 nm technology node and a secondary integrated chip having a thermal diode formed with processing variations corresponding to a 40 nm processing node.

In a conventional thermal sensor (e.g., as shown in FIG. 1A), a thermal sensor voltage 302 is generated by the secondary integrated chip formed with the 40 nm process and a bandgap reference voltage 304 is generated by a main integrated chip formed with a 28 nm process. As shown in graph 300, the thermal sensor voltage 302 received from a secondary integrated chip has a first curvature, while the bandgap reference voltage 304 received from the main integrated chip has a second curvature that is different than the first curvature. The resulting temperature error of the output signal 306 has a maximum value of approximately 9° C.

In the disclosed thermal sensor, a thermal sensor voltage 310 and a bandgap reference voltage 312 are received from a same integrated chip formed by a same integrated chip fabrication processes. As shown in graph 308, the thermal sensor voltage 310 received from a secondary integrated chip has a first curvature, while the bandgap reference voltage 312 received from the main integrated chip has a second curvature that is substantially the same as the first curvature. The resulting temperature error of the output signal 314 has a maximum value of approximately 4° C. Therefore, by measuring a temperature using signals generated by a same integrated chip, the temperature error the disclosed thermal sensor is reduced in comparison to conventional thermal sensors.

Figure 4A:
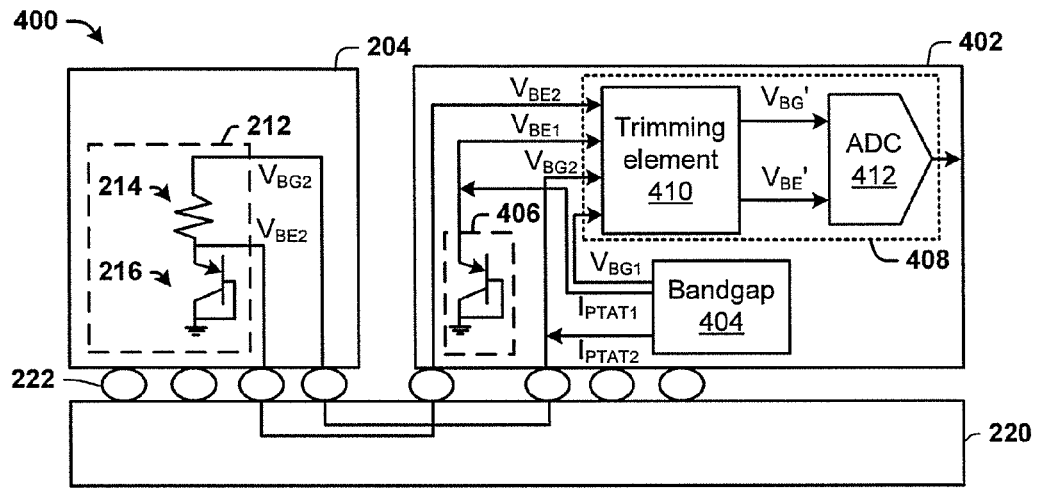
FIG. 4A illustrates a block diagram of some more embodiments of a stacked integrated chip structure comprising a main integrated chip having a disclosed thermal sensor.

FIG. 4A illustrates a block diagram of some more detailed embodiments of a stacked integrated chip structure 400 comprising a main integrated chip 402 having a disclosed thermal sensor 408.

The main integrated chip 402 comprises a bandgap reference circuit 404 configured to output a first bandgap reference voltage $V_{BG1}$ and one or more bias currents proportional to absolute temperature ($I_{PTAT1}$, $I_{PTAT2}$). The first bandgap reference voltage $V_{BG1}$ has a value that is substantially temperature independent. The first bias current $I_{PTAT1}$ is provided to a first thermal diode 406 comprised within the main integrated chip 402 and the second bias current $I_{PTAT2}$ is provided to a second thermal diode 212 comprised within the secondary integrated chip 204. The first thermal diode 406 comprises a diode connected PNP transistor device configured to output a first thermal sensed voltage $V_{BE1}$ comprising a base-emitter voltage of the diode connected PNP transistor device. The secondary integrated chip 204 comprises a second thermal diode 212 configured to output a second thermal sensed voltage $V_{BE2}$ as described above.

The thermal sensor 408 comprises a trimming element 410 and an analog-to-digital converter (ADC) 412. The trimming element 410 is configured to receive the first and second thermal sensed voltages $V_{BE1}$, $V_{BE2}$ and a bandgap reference voltage $V_{BG}$ from an integrated chip (e.g., a first thermal sensed voltage $V_{BE1}$ and a first bandgap reference voltage $V_{BG1}$ from the main integrated chip 402 or a second thermal sensed voltage $V_{BE2}$ and a second bandgap reference voltage $V_{BG2}$ from the secondary integrated chip 204). The trimming element 410 is configured to trim the values of the received voltages to reduce the temperature coefficient of the bandgap reference voltages so that they are substantially constant over a wide temperature range. A trimmed thermal sensed voltage $V_BE$ and a trimmed bandgap reference voltage $V_{BG'}$ are then output from the trimming element 410 to the ADC 412, which receives the trimmed thermal sensed and reference voltages. The ADC 412 is configured to compare the trimmed bandgap reference voltage $V_{BG'}$ and the trimmed thermal sensed voltage $V_{BE'}$ and to generate a digital output signal $S_{out}$ therefrom.

Figure 4B:
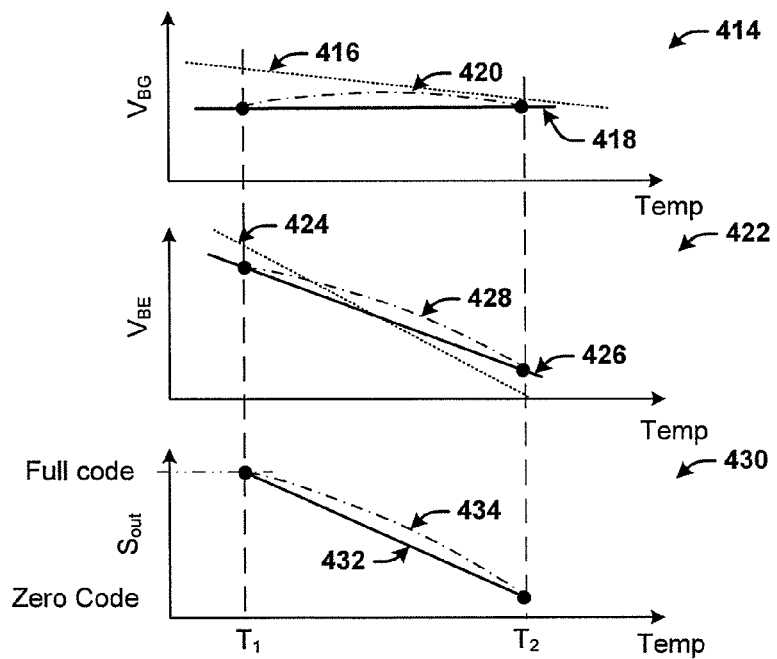
FIG. 4B illustrates graphs showing an example of a thermal sensed signal and a bandgap reference voltage signal received by a disclosed thermal sensor and an output signal generated based upon the received signals.

FIG. 4B illustrates graphs 414, 422, and 430 showing examples of a thermal sensed signal and a bandgap reference voltage signal received by thermal sensor 408 from a secondary integrated chip 204 and an output signal generated based upon the received signals.

Graph 414 illustrates the bandgap reference voltage $V_{BG2}$ (y-axis) as a function of temperature (x-axis). Trendline 416 illustrates the bandgap reference voltage $V_{BG2}$ received by the trimming element. The bandgap reference voltage $V_{BG2}$ of trendline 416 has a value that varies over a temperature range. Trendline 418 shows the bandgap reference voltage $V_{BG2}$ output from the trimming element. The trimming element varies the voltage so that the trendline 418 is constant over a wide range of temperatures (i.e., reduces the temperature coefficient of the reference circuit). Trendline 418 is an example of a two point trimming since the trimming is done to make the trendline 418 flat between a first temperature $T_1$ and a second temperature $T_2$. Even after trimming, a second order temperature curvature is present due to fabrication parameters of a process used to form the secondary integrated chip. The second order temperature curvature (i.e., the temperature curvature having an error value that changes as a function of temperature) is illustrated as trendline 420.

Graph 422 illustrates a thermal sensed voltage $V_{BE2}$ (y-axis) as a function of temperature (x-axis). Trendline 424 illustrates the thermal sensed voltage received by the trimming element. Trendline 426 shows the thermal sensed voltage output from the trimming element. The trimming performed to reduce the temperature coefficient of the bandgap reference voltage $V_{BG2}$ also varies the voltage of the thermal sensed voltage $V_{BE2}$. Trendline 428 illustrates a second order curvature of the thermal sensed voltage $V_{BE2}$ due to fabrication parameters of a process used to form the secondary integrated chip.

Graph 430 illustrates a trendline 432 showing a digital output signal $S_{out}$ (y-axis) of ADC 412 as a function of temperature (x-axis). The digital output signal $S_{out}$ is generated based upon a comparison of the bandgap reference voltage (graph 414) and the thermal sensed voltage (graph 422). Since the fabrication parameters affecting the thermal diode and the reference voltage source are the same, the bandgap reference voltage $V_{BG2}$ has a second order curvature (trendline 420) that is substantially equal to a second order curvature (trendline 428) of the thermal sensed voltage $V_{BE2}$. Since the digital output signal $S_{out}$ is proportional to the thermal sensed voltage $V_{BE2}$ divided by the reference voltage $V_{BG2}$, a same curvature of the thermal sensed voltage and the reference voltage allow the resulting output signal $S_{out}$ to have a low error. In other words, the errors of the thermal sensed voltage and the reference voltage substantially cancel out since their error due to fabrication parameters have a substantially same curvature.

Figure 5A:
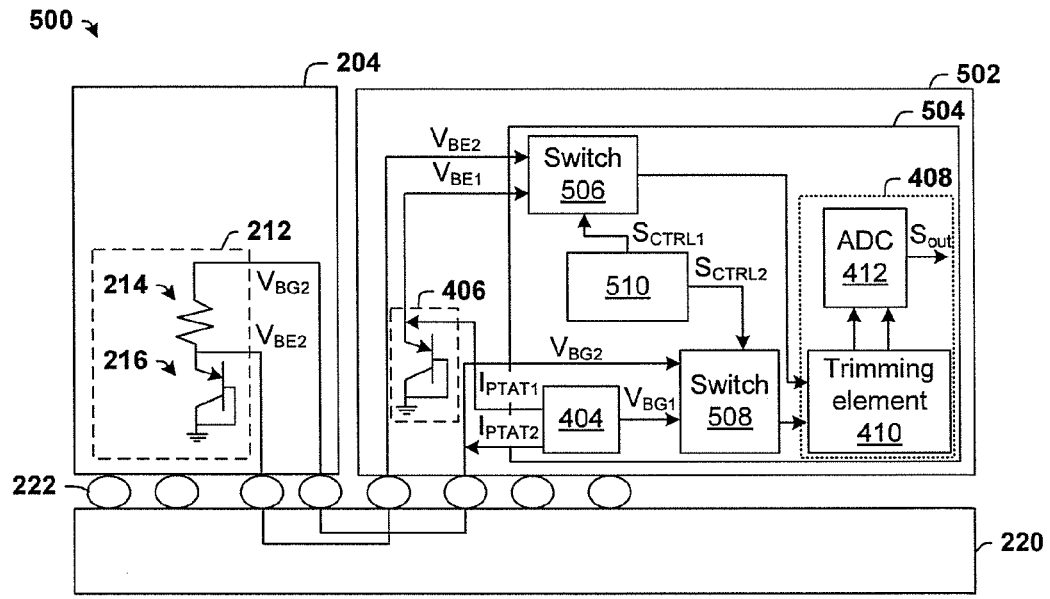
FIGS. 5A-5C illustrates block diagram of some embodiments of a stacked integrated chip structure having a first switching element and a second switching element configured to selectively control the signals provided a thermal sensor.

FIG. 5A illustrates a block diagram of some embodiments of a stacked integrated chip structure 500 having a thermal sensor module 504 comprising a first switching element 506 and a second switching element 508 configured to selectively control the signals provided to the thermal sensor 408.

The first switching element 506 is connected to a first thermal diode 406 and a second thermal diode 212. During operation, the first switching element 506 is configured to receive the first thermal sensed voltage $V_{BE1}$ and the second thermal sensed voltage $V_{BE2}$ and to selectively provide the first or second thermal sensed voltage, $V_{BE1}$ or $V_{BE2}$, to the trimming element 410.

The second switching element 508 is connected to a bandgap reference circuit 404 and the second thermal diode 212. During operation, the second switching element 508 is configured to receive the first bandgap reference voltage $V_{BG1}$ and the second bandgap reference voltage $V_{BG2}$ and to selectively provide the first or second bandgap reference voltage, $V_{BG}$ or $V_{BG2}$, to the trimming element 410.

In some embodiments, the main integrated chip 402 comprises a control element 510 configured to generate one or more control signals $S_{CTRL1}$, $S_{CTRL2}$ that selectively operate the first and second switching elements, 506 and 508, based upon whether a temperature of the main integrated chip 502 or the secondary integrated chip 204 is to be measured. In some embodiments, the control element 510 is configured to operate the first and second switching elements, 506 and 508, based upon a processing load of the respective integrated chips, 502 or 204. For example, if the control element 510 determines that the main integrated chip 502 is being primary used, it may operate the first and second switching elements, 506 and 508, to determine a temperature of the main integrated chip 502. In other embodiments, the control element 510 is configured to periodically monitor the temperatures of the plurality of integrated chips.

Figure 5B:
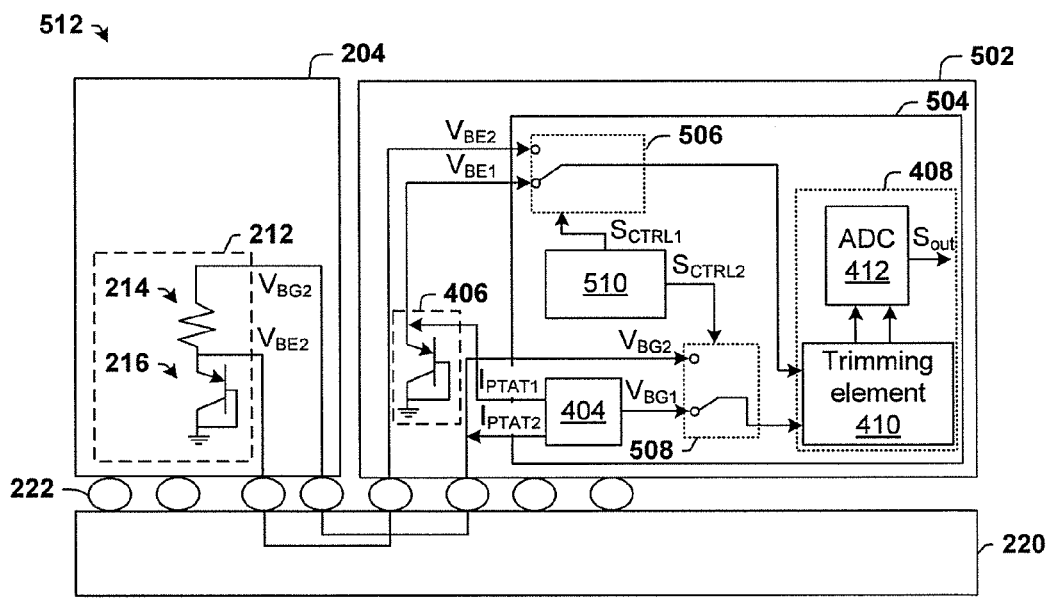
Figure 5C:
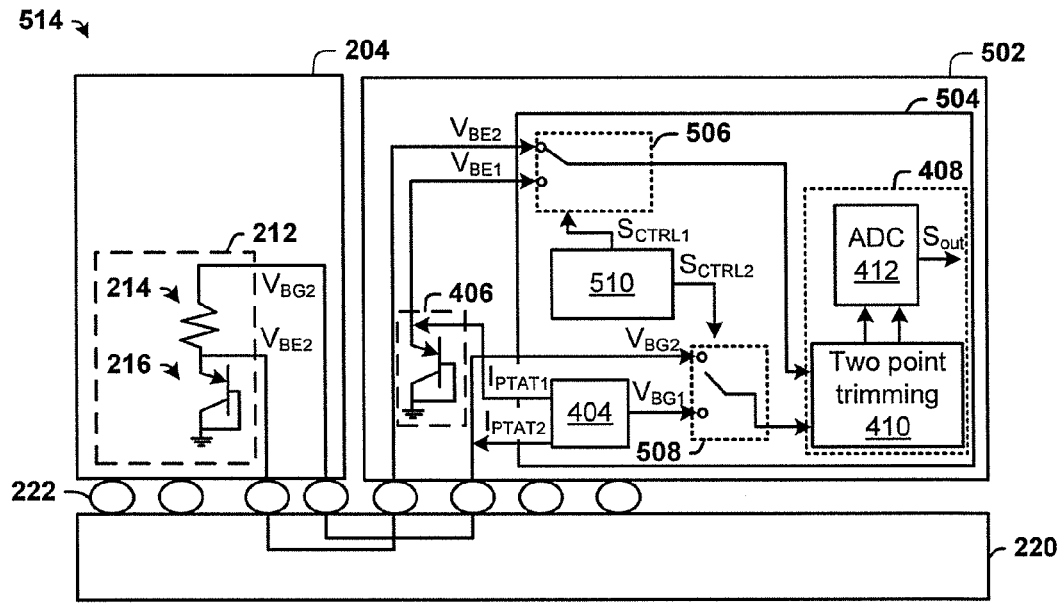

FIGS. 5B-5C illustrate operation of switching elements, 506 and 508, in a first and second operating mode, respectively.

In the first operating mode, shown in the stacked integrated chip structure 512 of FIG. 5B, the switching elements 506, 508 are operated to detect a temperature of the main integrated chip 502. To detect a temperature of the main integrated chip 502, switching element 506 is operated to connect the first thermal sensed voltage $V_{BE1}$ to the trimming element 410, while the second switching element 508 is operated to connect the first bandgap reference voltage $V_{BG1}$ to the trimming element 410. The trimming element 410 is configured to trim the signals before providing them to an analog-to-digital converter 412.

The analog-to-digital converter 412 compares the first thermal sensed voltage $V_{BE1}$ to the first bandgap voltage $V_{BG1}$ and generates a digital output signal $S_{out1}$ proportional to the temperature of the main integrated chip 502 based upon the comparison. Because the first bandgap voltage $V_{BG1}$ and the first thermal sensed voltage $V_{BE1}$ are generated from a same integrated chip, $V_{BE1}$ and $V_{BG1}$ have a same curvature due to the same process fabrication parameters (i.e., $V_{BE1}$ is substantially non-linear with a curvature that is dependent upon a process dependent constant). This is shown in the transfer function of the analog-to-digital converter 412, by the numerator and denominator having a same thermal sensed voltage, $V_{BE1}$:

$$\text{Transfer\_fucntion} = \frac{V_{BE}(T)}{V_{BG}(T)} = \frac{V_{BE1}(T)}{V_{BE1}(T) + \Delta V_{BE}(T) \cdot \text{Gain}}.$$

Since the numerator and denominator of the transfer function both have a second order curvature source of $V_{BE1}$, the curvatures cancel out, resulting in a low temperature error.

In the second operating mode, shown in the stacked integrated chip structure 514 of FIG. 5C, the first and second switching elements, 506 and 508, are operated to detect a temperature of the secondary integrated chip 204. To detect a temperature of the secondary integrated chip 204, first switching element 506 is operated to connect the second thermal sensed voltage $V_{BE2}$ to the trimming element 410, while the second switching element 508 is operated to connect the second bandgap reference voltage $V_{BG2}$ to the trimming element 410. The trimming element 410 trims the signals before providing them to an analog-to-digital converter 412

The analog-to-digital converter 412 compares the second thermal sensed voltage $V_{BE2}$ to the second bandgap voltage $V_{BG2}$ and generates a digital output signal $S_{out1}$ proportional to the temperature of the secondary integrated chip 204 based upon the comparison. Because the second bandgap voltage $V_{BG2}$ and the second thermal sensed voltage $V_{BE2}$ are generated from a same integrated chip, $V_{BE2}$ and $V_{BG2}$ have a same curvature due to the same process fabrication parameters. This is shown in the transfer function of the analog-to-digital converter 412, by the numerator and denominator having a same thermal sensed voltage, $V_{BE2}$:

$$\text{Transfer\_fucntion} = \frac{V_{BE}(T)}{V_{BG}(T)} = \frac{V_{BE2}(T)}{V_{BE2}(T) + \Delta V_{BE}(T) \cdot \text{Gain}}.$$

Since the numerator and denominator of the transfer function both have a second order curvature source of $V_{BE2}$, the curvatures cancel out, resulting in a low temperature error.

Figure 6:
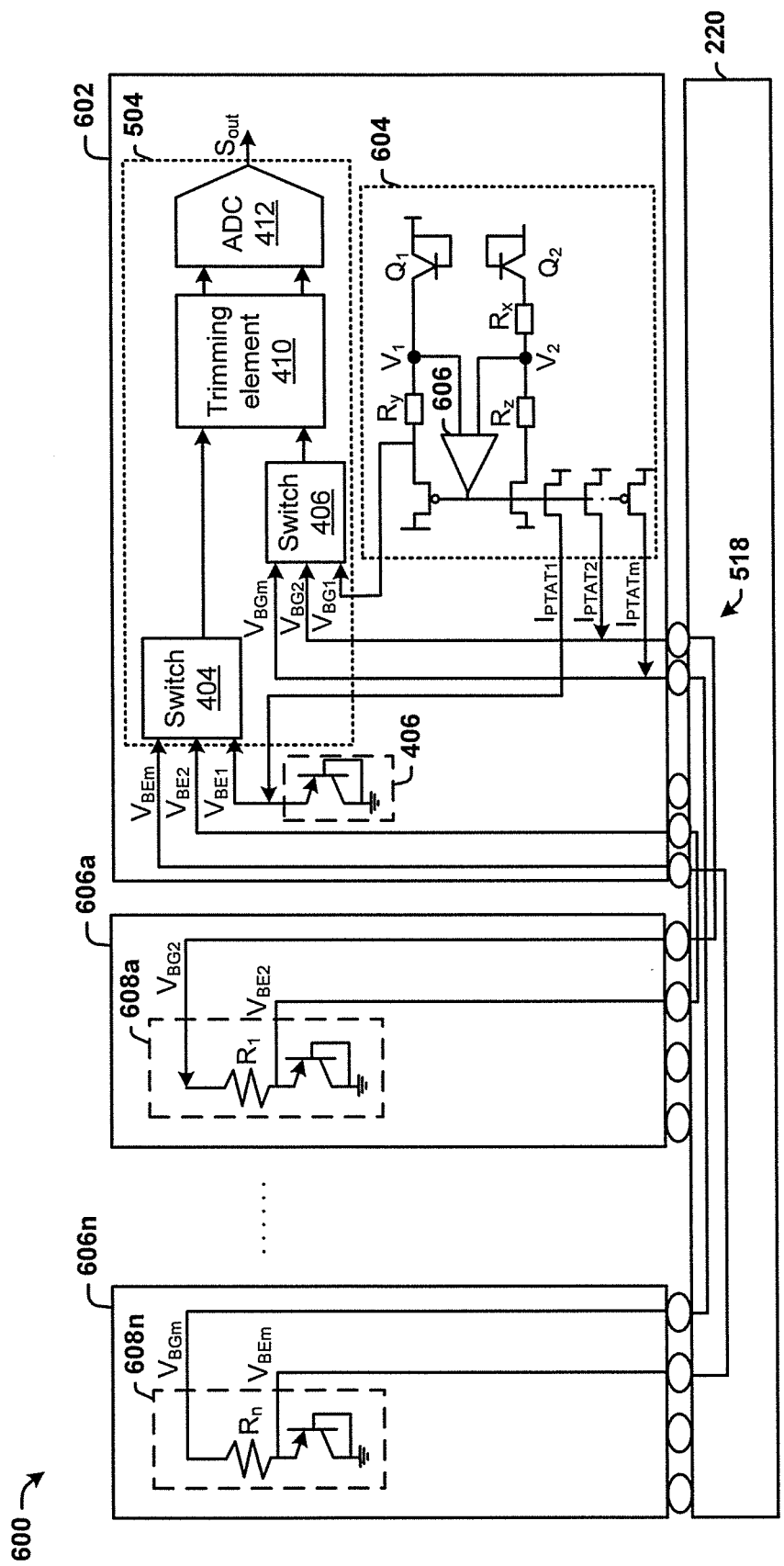
FIG. 6 illustrates a block diagram of some embodiments of a stacked integrated chip structure comprising a thermal sensor configured to determine a temperature of a plurality of integrated chips on an interposer substrate.

FIG. 6 illustrates a block diagram of some embodiments of a stacked integrated chip structure 600 comprising a thermal sensor configured to determine a temperature of a plurality of integrated chips (e.g., 602, 606a, . . . , 606n) located on an interposer substrate 220.

The stacked integrated chip structure 600 comprises a main integrated chip 602 along with a plurality of additional integrated chips 606a, . . . , 606n that are positioned on the interposer substrate 220.

The main integrated chip 602 comprises a bandgap reference circuit 604. In some embodiments, the bandgap reference circuit 604 comprises a first path having a first resistor $R_y$, in series with a first diode connected unit transistor $Q_1$. The bandgap reference circuit 604 further comprises a second path having a second resistor $R_x$ in series with a third resistor $R_z$ and with a second diode connected transistor $Q_2$ comprising n unit transistors connected in parallel. A feedback voltage from an operational amplifier 606 provides for equal currents $I_{PTAT}$ to the bases of transistors $Q_1$ and $Q_2$, which have different emitter areas. By forcing $V_1$ to be equal to $V_2$, the voltage drop on $R_y$ is equal to the temperature independent difference of the $V_{BE}$ of the transistors $Q_1$ and $Q_2$ (i.e., the bandgap reference voltage $V_{BG1}$ is the sum of the base-emitter voltage difference between $Q_1$ and $Q_2$).

The equal currents $I_{PTAT}$ generated by the operation amplifier 606 are currents proportional to absolute temperature ($I_{PTAT}$) and are equal to:

$$I_{PTAT1} = I_{PTAT2} = \frac{V_T \ln n}{Rx},$$

where $V_T$ is a thermal voltage constant (having a value of approximately 26 mV) and n is a number of parallel PNP devices in the second diode connected transistor $Q_2$ The current $I_{PTAT}$ is provided to a thermal diode 608 in each additional integrated chip 606. Upon receiving the current $I_{PTAT}$, each thermal diode 608 is configured to generate a bandgap reference voltage $V_{BG2}, \ldots, V_{BGm}$ that is proportional to a value of the resistor $R_1, \ldots, R_m$ within the thermal diode 608 (e.g., bandgap reference voltage $V_{BG2}$ is generated by $R_1$). For example, for a first additional integrated chip 606a, the bandgap reference voltage $V_{BG2}$ is equal to:

$$V_{BG2}(T) = V_{BE2} + I_{PTAT} * R1 = V_{BE2} + \frac{R1}{Rx} V_T \ln n,$$

where $R_1/R_x$ is the gain and $V_T$ is the thermal voltage. The second thermal sensed voltage $V_{BE2}$ is from the secondary chip, and has a negative temperature coefficient with poor temperature linearity due to second order curvature. The thermal voltage $V_T$ ($V_T=KT/q$) is from main chips and has a positive temperature coefficient with good temperature linearity. The combination of the positive and negative temperature coefficients provides the resulting bandgap reference voltage $V_{BG2}$ with a substantially temperature independent voltage value. Other additional integrated chips (e.g., additional integrated chip 606n) will have similar bandgap reference voltages. The bandgap reference voltages $V_{BG2}, \ldots, V_{BGm}$ are provided by way of interconnects 218 to a thermal sensor module 504.

Therefore, respective additional integrated chips 606a, . . . 606n comprise additional thermal diodes 608a, . . . , 608n configured to receive the bias current $I_{PTAT}$ and to based thereupon to generate additional thermal sensed voltages $V_{BE2}, \ldots, V_{BEm}$ and additional reference voltages $V_{BG2}, \ldots, V_{BGm}$ that are proportional to a temperature of the additional integrated chip.

Figure 7:
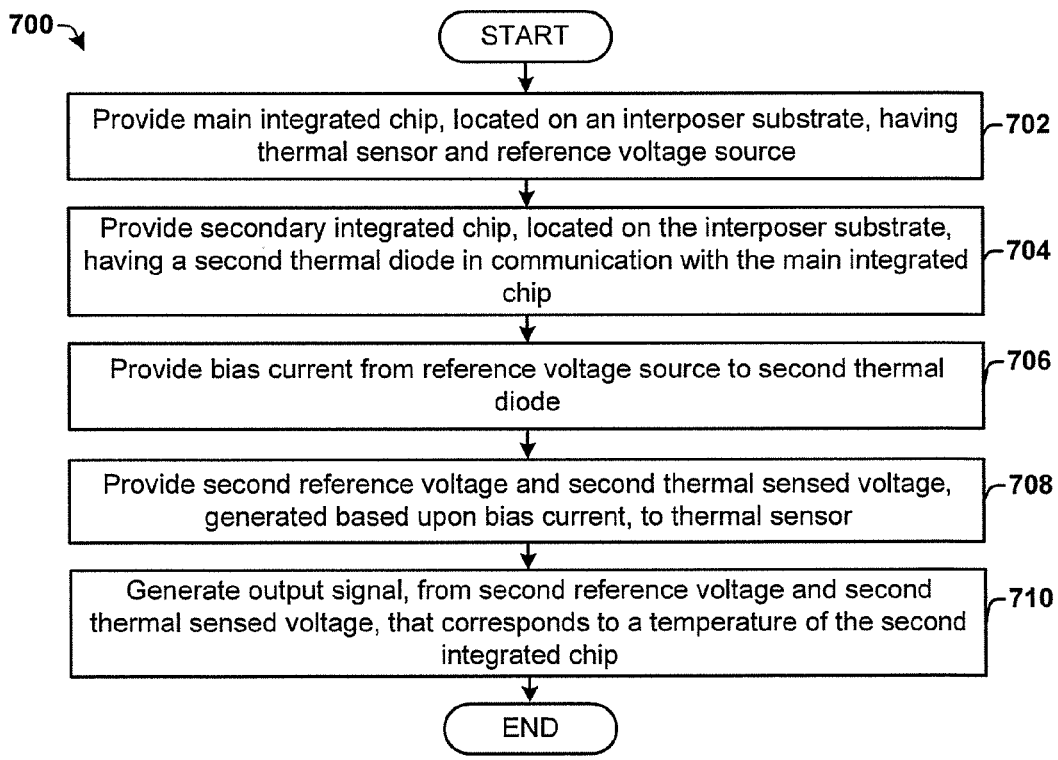
FIG. 7 shows a flow diagram of some embodiments of a method measuring a temperature of a plurality of integrated chips on a stacked integrated chip structure.

FIG. 7 illustrates a flow diagram of some embodiments of a method for measuring a temperature of a plurality of integrated chips on a stacked integrated chip structure.

While method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At step 702, a main integrated chip, located on an interposer substrate is provided. The main integrated chip comprises a thermal sensor and a reference voltage source. The reference voltage source is configured to generate a temperature independent bias current. The thermal sensor is configured to determine a temperature of an integrated chip based upon a substantially temperature independent reference voltage and a temperature dependent thermal sensed voltage. In some embodiments, wherein the reference voltage source comprises a bandgap reference circuit, the bias current comprises a current proportional to absolute temperature and the reference voltage comprises a bandgap reference voltage.

At step 704, a secondary integrated chip is provided to the interposer substrate. The secondary integrated chip comprises a second thermal diode in communication with the main integrated chip by way of one or more interconnects within the interposer substrate. In some embodiments, the second thermal diode comprises a resistor connected in series with a diode connected PNP transistor. In some embodiments, the secondary integrated chip is formed by an integrated chip fabrication process different than the integrated chip fabrication process used to form the main integrated chip.

At step 706, a bias current is provided from the reference voltage source to the second thermal diode. In response to the bias current, the second thermal diode is configured to generate a temperature independent second reference voltage and second thermal sensed voltage that is dependent on the temperature of the secondary integrated chip.

At step 708, the second reference voltage and the second thermal sensed voltage are provided to a thermal sensor. In some embodiments, upon receiving the second reference voltage and the second thermal sensed voltage, the thermal sensor is configured to trim the second reference voltage and the second thermal sensed voltage to reduce the temperature coefficient (i.e., the slope equal to the change in voltage over the change in temperature) of the second reference voltage.

At step 710, the thermal sensor is configured to generate an output signal based upon the second reference voltage and the second thermal sensed voltage. The output signal has a value that is proportional to a temperature of the secondary integrated chip from which the second reference voltage and the second thermal sensed voltage were received. The output signal is proportional to the second thermal sensed voltage divided by the second reference voltage. Therefore, since the second thermal sensed voltage and the second reference voltage are formed from a same chip (formed with a same process) the error due to processing variations is the same and substantially cancels out in determining an output signal.

Although method 700 is described as generating a temperature for a secondary integrated chip, it will be appreciated that the method may be applied to a plurality of additional integrated chips that are located on an interposer wafer along with the main integrated chip.

It will be appreciated that identifiers such as "first" and "second" do not imply any type of ordering or placement with respect to other elements; but rather "first" and "second" and other similar identifiers are just generic identifiers. In addition, it will be appreciated that the term "electrically connected" includes direct and indirect connections. For example, if element "a" is electrically connected to element "b", element "a" can be electrically connected directly to element "b" and/or element "a" can be electrically connected to element "b" through element "c", so long as there is an operable electrical connection between elements "a" and "b".

While the disclosure has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

Therefore, the present disclosure relates to a stacked integrated chip structure comprising a thermal sensor configured to accurately detect a temperature of a plurality of integrated chips located on an interposer substrate.

In some embodiments, the present disclosure relates a stacked integrated chip structure. The stacked integrated chip comprises a main integrated chip, comprising a reference voltage source configured to generate a first reference voltage and a bias current. A secondary integrated chip having a second thermal diode is configured to receive the bias current and based thereupon to generate a temperature independent second reference voltage and a second thermal sensed voltage that is proportional to a temperature of the secondary integrated chip. A thermal sensor is comprised within the main integrated chip and is configured to generate an output signal corresponding to a temperature of the secondary integrated chip based upon the second thermal sensed voltage and the second reference voltage. An interposer substrate is configured to provide interconnects between the main integrated chip and the secondary integrated chip.

In other embodiments, the present disclosure relates to a stacked integrated chip structure, comprising a main integrated chip located on an interposer substrate. The main integrated chip comprises a reference voltage source configured to generate a first reference voltage and a bias current, and a first thermal diode configured to generate a first thermal sensed voltage that is proportional to a temperature of the main integrated chip. A secondary integrated chip, located on the interposer substrate and in communication with the main integrated chip by one or more interconnects, comprises a resistor having a first terminal connected to the reference voltage source by the one or more interconnects and configured to receive the bias current and to provide a second thermal sensed voltage and a second terminal configured to provide a second reference voltage, and a diode connected PNP transistor device having a first terminal connected to the second terminal of the resistor and a second terminal connected to ground. A thermal sensor is comprised within the main integrated chip and is configured to generate an output signal, corresponding to a temperature of the integrated chip from which the trimmed thermal sensed voltage is received, which is based upon the first thermal sensed voltage and the first reference voltage or the second thermal sensed voltage and the second reference voltage.

In other embodiments, the present disclosure relates to method for measuring a temperature of an integrated chip on a stacked integrated chip structure. The method comprises providing a main integrated chip, located on an interposer substrate, having a thermal sensor and a reference voltage source configured to generate a bias current. The method further comprises providing a secondary integrated chip, located on the interposer substrate, and having a second thermal diode in communication with the main integrated chi. The method further comprises providing the bias current from the reference voltage source to the second thermal diode, wherein in response to the bias current, the second thermal diode generates a second reference voltage and a second thermal sensed voltage that is dependent on a temperature of the secondary integrated chip. The method further comprises providing the second reference voltage and the second thermal sensed voltage to the thermal sensor. The method further comprises generating an output signal, based upon the second reference voltage and the second thermal sensed voltage, which corresponds to a temperature of the secondary integrated chip.

What is claimed is:

1. A stacked integrated chip structure, comprising:
a main integrated chip, comprising a reference voltage source configured to generate a first reference voltage and a bias current;
a secondary integrated chip having a first thermal diode configured to receive the bias current and based thereupon to generate a second reference voltage and a first thermal sensed voltage that is proportional to a temperature of the secondary integrated chip;
a thermal sensor comprised within the main integrated chip and configured to generate an output signal corresponding to the temperature of the secondary integrated chip based upon the first thermal sensed voltage and the second reference voltage; and
an interposer substrate configured to provide interconnects between the main integrated chip and the secondary integrated chip.

2. The stacked integrated chip structure of claim 1, wherein the first thermal diode, comprises:
a resistor having a first terminal connected to the reference voltage source by way of the interconnects and a second terminal; and
a diode connected PNP transistor device having a first terminal connected to the second terminal of the resistor and a second terminal connected to ground,
wherein the second terminal of the resistor is configured to provide the first thermal sensed voltage and wherein the first terminal of the resistor is configured to provide the second reference voltage to the thermal sensor.

3. The stacked integrated chip structure of claim 1, wherein the main integrated chip is formed by a first integrated chip fabrication process and the secondary integrated chip is formed by a second integrated chip fabrication process different than the first integrated chip fabrication process.

4. The stacked integrated chip structure of claim 1, further comprising:
one or more additional integrated chips, located on the interposer substrate at a position laterally offset from the main integrated chip and the secondary integrated chip, wherein the one or more additional integrated chip respectively comprise additional thermal diodes configured to receive the bias current and based thereupon to generate additional temperature independent reference voltages and additional thermal sensed voltages that are respectively proportional to a temperature of the one or more additional integrated chips.

5. The stacked integrated chip structure of claim 1, wherein the main integrated chip further comprises:
a first thermal diode configured to generate a second thermal sensed voltage that is proportional to a temperature of the main integrated chip,
wherein the thermal sensor is configured to determine a temperature of the main integrated chip based upon the second thermal sensed voltage and the first reference voltage.

6. The stacked integrated chip structure of claim 5, wherein the thermal sensor comprises:
a trimming element configured to receive the first or second thermal sensed voltages and the first or second reference voltages, to perform trimming to reduce a temperature coefficient of the first or second reference voltages, and to output a trimmed thermal sensed voltage and a trimmed reference voltage; and
an analog-to-digital converter configured to receive the trimmed thermal sensed voltage and reference voltage and to generate a digital output signal having a value proportional to the trimmed thermal sensed voltage divided by the trimmed reference voltage.

7. The stacked integrated chip structure of claim 6, wherein the first or second thermal sensed voltage and the first or second reference voltage, respectively have a substantially equal curvature such that the output signal has a mitigated temperature error.

8. The stacked integrated chip structure of claim 6, further comprising:
a first switching element configured to selectively provide the first thermal sensed voltage or the second thermal sensed voltage to the trimming element;
a second switching element configured to selectively provide the first reference voltage or the second reference voltage to the trimming element; and
a control element configured to generate one or more control signals that selectively operate the first switching element and the second switching element.

9. The stacked integrated chip structure of claim 1, wherein the reference voltage source comprises a bandgap reference circuit.

10. The stacked integrated chip structure of claim 9, wherein the bias current comprises a current proportional to absolute temperature.

11. A stacked integrated chip structure, comprising:
a main integrated chip located on an interposer substrate, comprising:
a reference voltage source configured to generate a first reference voltage and a bias current;
a first thermal diode configured to generate a first thermal sensed voltage that is proportional to a temperature of the main integrated chip;
a secondary integrated chip located on the interposer substrate and in communication with the main integrated chip by one or more interconnects within the interposer substrate, wherein the secondary integrated chip comprises:
a resistor having a first terminal configured to provide a second reference voltage and a second terminal connected to the reference voltage source by the one or more interconnects and configured to receive the bias current and to provide a second thermal sensed voltage;

a diode connected PNP transistor device having a first terminal connected to the second terminal of the resistor and a second terminal connected to ground; and a thermal sensor comprised within the main integrated chip and configured to generate an output signal based upon the first thermal sensed voltage and the first reference voltage or the second thermal sensed voltage and the second reference voltage.

12. The stacked integrated chip structure of claim 11, wherein the main integrated chip is formed by a first integrated chip fabrication process and the secondary integrated chip is formed by a second integrated chip fabrication process different than the first integrated chip fabrication process.

13. The stacked integrated chip structure of claim 11, wherein the reference voltage source comprises a bandgap reference circuit.

14. The stacked integrated chip structure of claim 13, wherein the bias current comprises a current proportional to absolute temperature.

15. The stacked integrated chip structure of claim 11, wherein the thermal sensor comprises:

a trimming element configured to receive the first or second thermal sensed voltages and the first or second reference voltages, to perform trimming to reduce a temperature coefficient of the first or second reference voltages, and to output a trimmed thermal sensed voltage and a trimmed reference voltage; and an analog-to-digital converter configured to receive the trimmed thermal sensed voltage and reference voltage and to generate a digital output signal therefrom.

16. The stacked integrated chip structure of claim 15, wherein the output signal is equal to the trimmed thermal sensed voltage divided by the trimmed reference voltage.

17. The stacked integrated chip structure of claim 15, further comprising:

a first switching element configured to selectively provide the first thermal sensed voltage or the second thermal sensed voltage to the trimming element;

a second switching element configured to selectively provide the first reference voltage or the second reference voltage to the trimming element; and a control element configured to generate one or more control signals that selectively operate the first switching element and the second switching element.

18. A method for measuring a temperature of an integrated chip on a stacked integrated chip structure, comprising:

providing a main integrated chip, located on an interposer substrate, having a thermal sensor and a reference voltage source configured to generate a first reference voltage and a bias current;

providing a secondary integrated chip, located on the interposer substrate, and having a first thermal diode in communication with the main integrated chip;

providing the bias current from the reference voltage source to the first thermal diode, wherein in response to the bias current, the first thermal diode generates a second reference voltage and a thermal sensed voltage that is dependent on a temperature of the secondary integrated chip;

providing the second reference voltage and the thermal sensed voltage to the thermal sensor; and generating an output signal from the thermal sensor, based upon the second reference voltage and the thermal sensed voltage, which corresponds to a temperature of the secondary integrated chip.

19. The method of claim 18, wherein the secondary integrated chip is formed by an integrated chip fabrication process different than the integrated chip fabrication process used to form the main integrated chip.

20. The method of claim 18, further comprising:

trimming the second reference voltage and the thermal sensed voltage to reduce a temperature coefficient of the second reference voltage prior to generating the output signal.

* * * * *